Sept. 8, 1936.  P. HETENYI  2,053,334
FIXED DUAL CONDENSER
Filed Jan. 22, 1934
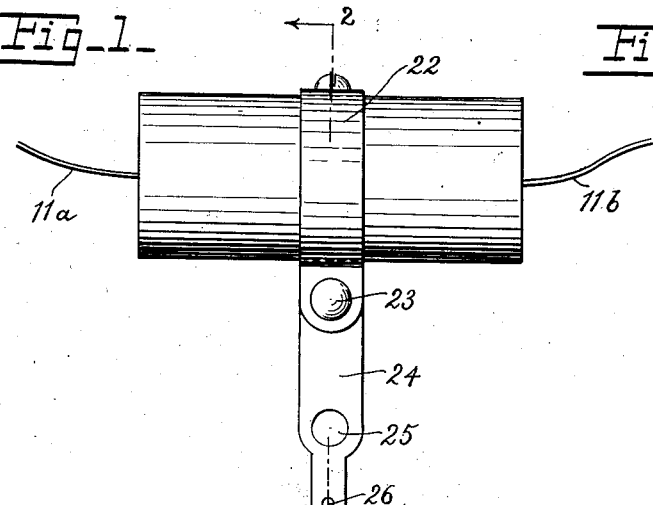
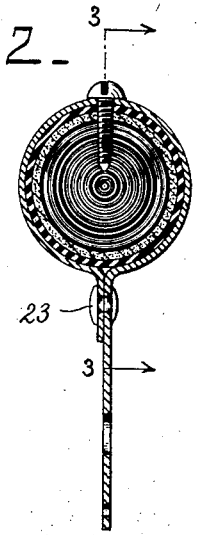
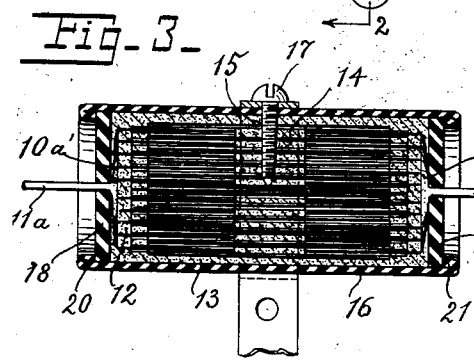
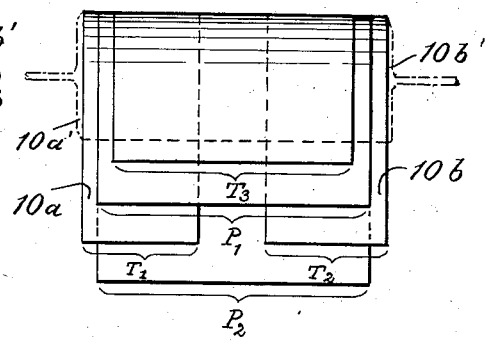
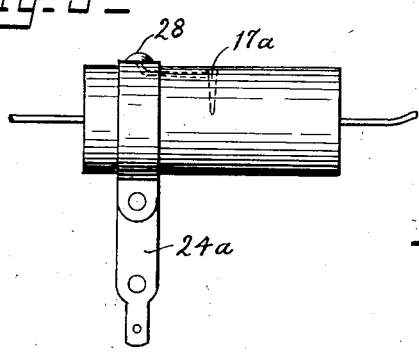
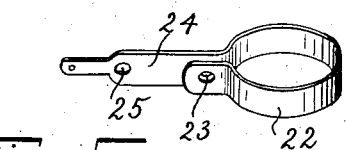
PAUL HETENYI
INVENTOR
BY Schech & Kohle
his ATTORNEYS.

Patented Sept. 8, 1936

2,053,334

UNITED STATES PATENT OFFICE 2,053,334

FIXED DUAL CONDENSER

Paul Hetenyi, New York, N. Y., assignor to Solar Manufacturing Corporation, a corporation of New York Application January 22, 1934, Serial No. 707,625

8 Claims. (Cl. 175—41)

This invention relates to improvements of electrical condensers of unchangeable capacity and in particular of tubular paper condensers of this class. It has for its general purpose the manufacture of a condenser of the described kind, having a dual construction, that is: an assembly which practically comprises two condensers with separate capacities, mostly, although not necessarily, of the same magnitude, yet of such interconnection that one conductor coil or electrode is common to both condensers and the terminal of this conductor or electrode is the common terminal for either condenser, having separate electrodes with terminals of opposite polarity.

This combination is accomplished, broadly speaking, by winding one wide strip of metal foil in opposition with two narrow widths of metal foil, separated by dielectrics, into a spiral coil, and attaching a proper terminal wire or binding post to each of the aforementioned conductors. If the wide strip of metal foil is used for the positive charge, both of the narrow strips are provided with negative lead-outs, and vice versa.

The principal object of my invention therefore is to provide a novel and improved condenser which will comprise a dual condenser.

Another object of the invention is to provide a condenser of predetermined unchangeable capacity which will comprise a dual condenser in the external shape of a single condenser.

A further object is to provide an improved dual condenser of fixed capacity which will have as low a power factor as possible.

A further object is to provide a static dual condenser with improved insulation, compared with the usual standard of static condensers on the market.

Another object is to provide a fixed dual paper condenser which under test will stand higher voltages than similar paper-wound condensers, manufactured by the old method and consequently will show a very small, if any, percentage of rejections.

Another object is to provide an improved static dual condenser which will have a minimum number of break-downs during active service under exacting working conditions, be they of occasional electrical surplus charges or under unusual atmospheric conditions of heat or moisture; for example, when used as radio-frequency condensers in tropical countries.

Another object is to provide an inexpensive simple static condenser of dual construction, which is durable, reliable in emergency cases of service and not subject to changing conditions of climate and weather.

Another object, apart from the former ones is to eliminate or at least to reduce to a minimum a drawback which is a usual concomitant of dual or coupled condenser construction so far as hitherto has been attempted; i. e., the excessive mutual induction between the two individual sections.

A further object, in compass with the last one, is to reduce the inner resistance inherent in the spirally wound conductors, which is a contributing factor of the above mentioned mutual induction.

A further object is to provide a novel and improved terminal construction for the conductor which is common to the two separate conductor sections of the dual combination.

A corollary object to the last named is to provide a terminal construction which will simultaneously serve as a retaining and compressive member for the tubular condenser as a whole.

A similar object is to give this terminal such a shape that it can be used at the same time as a support and fastening bracket for the condenser.

A further object is to shape such terminal which serves the triple function of lead-out, compressive retainer and supporting bracket, in such simple form that it may be used in very crowded spaces as a handy fastening means which is an important advantage if said dual static condenser is used in radio sets.

A further object, which so to speak adds a fourth function to the described common terminal, is to use it as a support as well as a cooperating member of the aforementioned resistance-reducing means.

Other objects will become apparent from a more detailed description of the proposed construction in conjunction with the accompanying drawing but it must be understood that the article of manufacture shown is to be taken as illustrative only and that many modifications are possible without deviating from the spirit of the invention, also that the construction is not confined to the exact details specifically shown and described, but can be executed by a great number of modifications and structural equivalents.

Having thus generally described some of the features and objects of my invention, I will more particularly describe the same by reference to the annexed drawing, in which similar reference characters indicate similar parts throughout the different views.

In the accompanying drawing—

Fig. 1 shows an outside view of a finished paper condenser of fixed capacity of dual construction, encased in a protecting and retaining cover or container made according to and embodying my invention. It also shows the application of the novel terminal which serves as a supporting bracket for the condenser;

Fig. 2 is a middle section through the condenser and its supporting terminal along the line 2—2 of Fig. 1, looking in the direction of the arrows;

Fig. 3 is a longitudinal cross section through the condenser, taken along line 3—3 of Fig. 2;

Fig. 4 shows the condenser, removed from its outer protective tube or casing and about to be unrolled, indicating the mutual relation of the foils to the dielectric layers;

Fig. 5 shows a slightly modified construction which proves advantageous under certain restrictions of available space, also indicating that the location of the supporting terminal is not indispensably in the center of the condenser;

Fig. 6 is a perspective view of the supporting terminal member, separated from the condenser.

Referring more in detail to the illustrations, the structure of this paper-wound dual condenser comprises two conducting sheets $T_1$ and $T_2$ in juxtaposition but separated by a margin wide enough to prevent any touch or even leakage between them and a superimposed third conducting sheet $T_3$ of about the double width of either of the aforementioned sheets, if they happen to be of equal superficial capacity. At any rate, the width of the conducting sheet $T_3$ should equal the total width of both opposed sheets, $T_1$ and $T_2$. These two sets of sheets, which serve as conductors of static electricity of opposite polarity, one comprising a pair of juxtapositioned narrow sheets, the other consisting of a single and broader sheet, are insulated and separated from each other by one or more inserted sheets of dielectric material, $P_1$, and inasmuch as the two sets are spirally wound on themselves into a coil, there must be provided another layer of one or more dielectric sheets $P_2$, placed underneath the two juxtapositioned narrow sheets.

These conducting and insulating sheets, however, are not superimposed over each other with their longitudinal margins all in alignment, but rather in the manner illustrated in Fig. 4. While the conducting sheet $T_3$ runs exactly in the middle of the roll spaced well apart from the outer edges, the dielectric strip (or strips) $P_1$ and $P_2$, which may be of equal width, protrudes over the longitudinal margins of $T_3$, and the two opposing conducting sheets $T_1$ and $T_2$, which, as said before, are separated by a non-conductive middle space between their inner margins, protrude beyond the edges of the dielectric sheet. In this way the insulating distance between the outer edges of the common conductor sheet and those of the opposed dual conductor strips is made very wide and the chance of leakage or sparking over is lessened to a minimum.

The conducting sheets $T_1$, $T_2$, and $T_3$ are made of metal, preferably tinfoil, while the dielectric material consists of tissue paper boiled in paraffin wax or similar non-conductive material of high dielectric strength. These sheets, thus arranged in juxta- and super-position to each other are then rolled together tightly into a cylindrical roll, forming involved conducting spirals. It is apparent from a contemplation of the arrangement that each of the narrow strips $T_1$ and $T_2$ forms a free protruding spiral rim at its respective end of the roll, as indicated by numerals $10a$ and $10b$ which by soldering can be solidified into a continuous terminal disk $10a'$ and $10b'$, (Figs. 3 and 4) and be attached to a terminal wire $11a$, $11b$, or a ribbon or loop, as the case may be, while the common conductor sheet $T_3$ which, as Fig. 4 indicates, forms the outside wrapper, must be connected to a lead-out separately attached somewhere to its outer surface.

The rest of the treatment of this tightly wound roll, as far as the final encasing is concerned, follows well known methods, and no special claim for this procedure is made, except as to its being used in combination with the novel features of this construction.

After the roll is tightly wound and bound together, usually by a sealing strip of insulating material, the finished roll is subjected to a vacuum wax impregnation process so as to draw out of it all moisture and thoroughly saturate it with paraffin wax or another cereous substance indicated by numeral $12$, after which the condensers are placed in paper tubes $16$, whereupon all the remaining clearances are filled with the same wax or cereous substance, usually under vacuum.

This filling wax not only fills the empty spaces between the spiral rims of the protruding edges $10a$ and $10b$ of the sheets $T_1$ and $T_2$ and the eventual clearance $13$ between the outer conducting sheet $T_3$ and the encasing paper tube $16$, but likewise the spaces $14$ in the center of the roll which separate the two layers $T_1$ and $T_2$. In order to facilitate the entrance of the wax filler into this central zone and also to allow the escape of the air, it is advisable to perforate the common foil $T_3$ by a radially directed hole at $15$, at the same place where the screw or peg $17$, whose function will be described later, is to be inserted.

Two fiber washers, $18$ and $19$, perforated for the lead-ins $11a$ and $11b$, can advantageously be placed into the open ends of the paper or fibre tubes $16$, and the edges of the latter be spun over or crimped, as shown at $20$ and $21$, although these features are not indispensable and the ends could also be sealed by molten wax, paraffin or asphaltum.

It remains to describe the application of the terminal or lead-in for the common electrode or conductor coil $T_3$. This terminal consists of an annular metal band or strap $22$ which is tightly drawn around the tube $16$ and held in place by a single rivet $23$. The extremities of this band where they meet and are drawn together by this rivet (or screw, as the case may be) are of unequal length, one elongated end $24$ serving as a bracket or attaching means and provided with one or more perforations $25$, $26$ for bolts or rivets.

If the connection between this terminal ring $22$ and the electrode $T_3$ is made in the usual way, i. e. by a short wire which is soldered to the inside of the ring as well as to the surface of the last spiral turn of sheet $T_3$, it is usually found that the resistance set up in the thin turns of this coil, used as common electrode, is high enough at radio frequencies to cause appreciable induction or coupling between the two separate other coils $T_1$ and $T_2$.

I have found now that this undesirable feature can be eliminated and the series resistance effect of the individual sections greatly improved by providing a terminal pin or screw $17$ which by being threaded or driven through the different layers of the spiral sheet $T_3$—where it cannot make contact with the opposing sheets T₁ and T₂, viz: in the central zone, makes contact with each individual turn of sheet T₃, connecting them in parallel, so to speak. This reduces the serial resistance of the common electrode to that of a single turn, while that of the separate sections T₁ and T₂ are reduced to a minimum already by the soldering connections mentioned before. Care of course must be taken to prevent this lead-screw or pin to come into contact with any parts of the two narrow strips and thereby to cause a short circuit. The connection is furthermore perfected by soldering after the screw or pin is in place or by pouring liquid solder into the drilled hole before inserting the screw.

If for any reason it would be advantageous to arrange the annular terminal towards the end of the condenser, the appropriate connection with the common electrode can be made, as indicated in dotted lines in Fig. 5. The connecting peg 17a for the separate turns of the electrode is driven into the free central zone of the condenser and a wire connection is made to the soldered head 28 of the terminal 24a. Thus it is seen that all the mentioned objects of the invention are fulfilled, but it should be evident that many modifications and changes are possible without deviating from the principles of the inventive concept, and the scope of it should therefore be judged not so much from the details disclosed, as from the attached claims.

Having now described my invention, what I claim and desire to secure by Letters Patent, is:

1. The combination with a dual paper wound condenser of fixed capacity comprising two conducting foil sheets wound in parallel juxtaposition and spaced apart non-conductively by a marginal zone of sufficient width, and a superimposed conducting foil of an area approximately equal to the combined area of the underlying two foil sheets, said foils wound together with a plurality of intermediate dielectric sheets into a cylindrical roll; of means adapted to minimize the inductive coupling between the oppositely wound foils, said means consisting of a conductive path in a radial direction between the superimposed layers of the large area foil in the marginal zone separating the two foils of smaller area.

2. The combination with a dual paper wound condenser of fixed capacity comprising two conducting foil sheets wound in parallel juxtaposition and spaced apart non-conductively by a marginal zone of sufficient width, and a superimposed conducting foil of an area approximately equal to the combined area of the underlying two foil sheets, said foils wound together with a plurality of intermediate dielectric sheets into a cylindrical roll; of means adapted to minimize the inductive coupling between the oppositely wound foils, said means consisting of a metallic peg perforating the superimposed layers of the large area foil in the marginal zone between the two smaller foils and short circuiting said layers.

3. The combination with a dual paper wound condenser of fixed capacity comprising two conducting foil sheets wound in parallel juxtaposition and spaced apart non-conductively by a marginal zone of sufficient width, and a superimposed conducting foil of an area approximately equal to the combined area of the underlying two foil sheets, said foils wound together with a plurality of intermediate dielectric sheets into a cylindrical roll; of a terminal outlet for the large area foil, consisting of an annular strap encircling said condenser, having an extension adapted to serve as a supporting bracket for said condenser, and means adapted to minimize the inductive coupling between the oppositely wound foils, said means consisting of a metallic peg which connects the aforesaid annular terminal directly and in a straight path with every turn of the large area foil within the marginal zone between the foils of smaller area.

4. The combination with a dual paper-leaved condenser of fixed capacity comprising two sets of metallic foil electrodes, destined for charges of equal polarity, arranged in parallel level juxtaposition and spaced apart non-conductively by a marginal zone of sufficient width, and an interleafed third conducting foil set for opposite polarity and of an area approximately equal to the combined area of the first two foil sets, insulated from them by a plurality of intermediate dielectric sheets; of means adapted to minimize the inductive coupling between the oppositely polarized foils, said means consisting of a conductive path between the superimposed layers of the large area foil in the marginal zone separating the two foils of smaller area.

5. The combination with a dual paper-leaved condenser of fixed capacity comprising two sets of metallic foil electrodes, destined for charges of equal polarity arranged in parallel level juxtaposition and spaced apart non-conductively by a marginal zone of sufficient width, and an interleafed third conducting foil set for opposite polarity and of an area approximately equal to the combined area of the first two foil sets, insulated from them by a plurality of intermediate dielectric sheets; of means adapted to minimize the inductive coupling between the oppositely polarized foils, said means consisting of a metallic pin perforating the superimposed layers of the large area foil in the marginal zone between the two smaller foils and short circuiting said layers.

6. The combination with a dual paper-wound condenser of fixed capacity comprising two conducting foil sheets, spirally wound, spaced apart non-conductively and each provided with a separate outside terminal destined for the same polarity, a third conducting foil sheet, forming a continuous strip, spirally wound in common non-conductive juxtaposition to both aforesaid foil sheets and destined for the opposite polarity and a non-conductive outer cover, enveloping the assembly of all three foil sheets; of a conducting path, short-circuiting the spiral layers of the third foil sheet and leading toward the outside and an annular retaining strap conductively connected with said conducting path, adapted to compressively encircle all assembled foil sheets and to serve as an outside terminal for the third foil sheet.

7. The combination with a dual paper wound condenser of fixed capacity comprising two conducting foil sheets wound in parallel juxtaposition and spaced apart non-conductively by a marginal zone of sufficient width, and a superimposed conducting foil of an area approximately equal to the combined area of the underlying two foil sheets, said foils wound together with a plurality of intermediate dielectric sheets into a cylindrical roll; of means adapted to retain the assembled foil sheets in compressed condition and to simultaneously minimize the inductive coupling between the oppositely wound foils, said means consisting of an annular retaining strap, compressively wound around the marginal zone between the first two foil sheets, but insulated from said foil sheets, and a metallic screw, imbedded in said strap and compressively perforating the superimposed layers of the large area foil in said marginal zone, short circuiting said layers.

8. The combination with a dual paper wound condenser of fixed capacity comprising two conducting foil sheets wound in parallel juxtaposition and spaced apart non-conductively by a marginal zone of sufficient width, and a superimposed conducting foil of an area approximately equal to the combined area of the underlying two foil sheets, said foils wound together with a plurality of intermediate dielectric sheets into a cylindrical roll; of means adapted to retain the assembled foil sheets in compressed condition and to simultaneously minimize the inductive coupling between the oppositely wound coils, said means consisting of an insulated annular retaining strap, compressively wound around the assembled foil sheets and serving as a terminal for the large area foil, and a conductive path leading from said terminal toward and through the marginal zone separating the two foils of smaller area, said conductive path joining all superimposed turns of the larger area.

PAUL HETENYI.